US007637140B2

(12) United States Patent
Reichl

(10) Patent No.: US 7,637,140 B2
(45) Date of Patent: Dec. 29, 2009

(54) METHOD AND DEVICE FOR DETECTING AN INCORRECTLY CONNECTED DIFFERENTIAL PRESSURE SENSOR

(75) Inventor: Christian Reichl, München (DE)

(73) Assignee: Siemens Aktiengesellschaft, Munich (DE)

( * ) Notice: Subject to any disclaimer, the term of this patent is extended or adjusted under 35 U.S.C. 154(b) by 442 days.

(21) Appl. No.: 11/550,622

(22) Filed: Oct. 18, 2006

(65) Prior Publication Data

US 2007/0119228 A1 May 31, 2007

(30) Foreign Application Priority Data

Oct. 18, 2005 (DE) ...................... 10 2005 049 870

(51) Int. Cl.
*G01L 27/00* (2006.01)

(52) U.S. Cl. .................................... 73/1.57; 73/114.76

(58) Field of Classification Search ....................... None
See application file for complete search history.

(56) References Cited

U.S. PATENT DOCUMENTS

| | | | | |
|---|---|---|---|---|
| 7,096,009 | B2 | 8/2006 | Mousseau et al. | 455/415 |
| 2004/0040285 | A1 | 3/2004 | Strohmaier et al. | 60/277 |
| 2004/0214558 | A1 | 10/2004 | Chang et al. | 455/416 |
| 2005/0059439 | A1 | 3/2005 | White et al. | 455/575.1 |

FOREIGN PATENT DOCUMENTS

| | | | |
|---|---|---|---|
| DE | 101 12 138 | A1 | 9/2002 |
| DE | 101 45 863 | A1 | 4/2003 |

*Primary Examiner*—Robert R Raevis
(74) *Attorney, Agent, or Firm*—King & Spalding L.L.P.

(57) ABSTRACT

An incorrectly connected differential pressure sensor with a high and a low pressure connection to an exhaust gas duct in parallel with a particle filter can be detected by checking at least one predefined criterion stable operating conditions. If stable operating conditions are present, at least one uncorrected differential pressure value is determined from sensor signals of the differential pressure sensor. In a first detection, the uncorrected differential pressure value representing the stable conditions is checked whether it satisfies a first predefined error criterion. In a second detection after the end of the engine operation, a value is determined for an offset parameter of a differential pressure sensor characteristic, a corrected minimum differential pressure value is determined as a function of the determined offset parameter value and the uncorrected differential pressure value, and a check is made whether the corrected minimum differential pressure value satisfies a second predefined error criterion.

25 Claims, 2 Drawing Sheets

METHOD AND DEVICE FOR DETECTING AN INCORRECTLY CONNECTED DIFFERENTIAL PRESSURE SENSOR

PRIORITY

This application claims priority from German Patent Application No. DE 10 2005 049 870.1, which was filed on Oct. 18, 2005, and is incorporated herein by reference in its entirety.

TECHNICAL FIELD

The present invention relates to a method for detecting an incorrectly connected differential pressure sensor with a high and a low pressure connection to an exhaust gas duct of an internal combustion engine in parallel with a particle filter and means for executing the method.

BACKGROUND

In order to clean exhaust gases produced by internal combustion engines to remove particles, particularly diesel engines, particle filters located in an exhaust gas duct of the internal combustion engine can be employed, through which the exhaust gas is routed. Such a particle filter filters the particles out of the exhaust gas stream, whereby the particles remain in the particle filter. In order to maintain the continuing function of the particle filter, the latter must be regenerated once it has reached a certain loading level. To this end it is necessary to check the loading status of the particle filter.

For this purpose, it is advantageous to utilize the effect whereby the pressure difference between the exhaust gas inlet and the exhaust gas outlet of the particle filter, also referred to as differential pressure in the following, depends on the loading with particles. In order to measure the pressure difference differential pressure sensors are employed which are connected in parallel with the particle filter into the exhaust gas duct and are thus able to sense the drop in pressure in the exhaust gas stream across the particle filter, in other words the difference between the pressure directly upstream of the particle filter and the pressure directly downstream of the particle filter. In this situation and in the following the expressions “directly upstream” and “directly downstream” are understood to mean that no sections of the exhaust gas duct lie between the thus designated area in the exhaust gas duct directly upstream or downstream of the particle filter and the exhaust gas inlet or outlet of the particle filter, which cause a drop in pressure comparable to the drop in pressure at the particle filter, such that the differential pressure sensor in actual fact essentially senses the differential pressure generated by the particle filter.

To this end the differential pressure sensors have two gas connections which are also referred to in the following as high and low pressure connections. The high pressure connection is defined by the fact that the sensor delivers a sensor signal which represents a positive differential pressure when a greater pressure is present at the high pressure connection than at the low pressure connection. The designation high pressure connection or low pressure connection does not however imply in any way that high pressure, in other words a quantitatively high pressure, or low pressure, in other words a quantitatively low pressure, is applied to this connection.

The differential pressure sensors used do however exhibit properties which make it necessary for the high pressure connection of the differential pressure sensor to be connected to the exhaust gas duct upstream of the particle filter and the low pressure connection of the differential pressure sensor to be connected to the exhaust gas duct downstream of the particle filter.

Thus, although the differential pressure sensors used have a linear characteristic, in other words a linear relationship between the voltage of the sensor signal and the pressure difference present between the high and the low pressure connections, the offset does however drift, in other words the voltage of the sensor signal changes at a differential pressure of 0 bar over the course of time. Moreover, the measuring range for negative differential pressures in which a reliable measurement is possible is only very restricted.

Therefore, if when the differential pressure sensor is installed, for example during manufacture or in the event of a repair, it is connected with high and low pressure connections to the exhaust gas duct reversed, incorrect values will be supplied for the differential pressure sensed. Reliable detection of the loading status of the particle filter would not then be possible, with the result for example that the need for regeneration would not be reliably detected and the particle filter could then no longer adequately clean the exhaust gas.

It would now be conceivable, before starting up the internal combustion engine, if there is no pressure difference between the high and the low pressure connection, to determine the offset of the differential pressure sensor by sensing the differential pressure. On the basis of differential pressures which have been determined with the particular offset, it is then possible to ascertain whether or not reversed connections have been made.

However, it appears difficult to define the offset with sufficient accuracy before starting up the internal combustion engine. Only the time between turning on the ignition and starting the engine remains for determining the offset. This period of time can however be too short for determining the offset, for example if the driver turns the ignition key through the position in which the ignition is turned on, fully into the starting position. Moreover, the starter can place such a load on the vehicle electrical system that the differential pressure sensor and an evaluation facility for the signals from the sensor are not adequately supplied with power. Furthermore, for example in the case of very cold ambient conditions, the particle filter and the differential pressure sensor may be in a state which is not typical for operation and cannot therefore be used. Adaptation of the offset before starting up the internal combustion engine accompanied by detection based thereon of a reversed connection therefore appear less than appropriate.

For this reason it would be desirable to be able to detect or diagnose an incorrect connection of the differential pressure sensor, in other words a connection of the low pressure connection to the exhaust gas duct directly upstream of the particle filter and connection of the high pressure connection to the exhaust gas duct directly downstream of the particle filter, in a simple manner.

SUMMARY

The object of the present invention is therefore to provide a method for detecting an incorrectly connected differential pressure sensor with a high and a low pressure connection to an exhaust gas duct of an internal combustion engine in parallel with a particle filter and means for executing the method.

The object can be achieved by a method for detecting an incorrectly connected differential pressure sensor with a high and a low pressure connection to an exhaust gas duct of an internal combustion engine in parallel with a particle filter in the exhaust gas duct, whereby a check is made during operation of the internal combustion engine as to whether stable operating conditions are prevailing in the exhaust gas duct according to at least one predefined criterion, and at least if stable operating conditions are present at least one uncorrected differential pressure value representative of the stable operating conditions is determined from sensor signals of the differential pressure sensor, and whereby with regard to a first detection a check is made during operation of the internal combustion engine as to whether the uncorrected differential pressure value representative of the stable operating conditions satisfies a first predefined error criterion for an incorrect connection, and/or whereby with regard to a second detection after the end of operation of the internal combustion engine a value is determined for an offset parameter of a characteristic of the differential pressure sensor, depending on the determined offset parameter value and the uncorrected differential pressure value representative of the stable operating conditions a corrected minimum differential pressure value is determined and a check is made as to whether the corrected minimum differential pressure value satisfies a second predefined error criterion for an incorrect connection.

The object is likewise achieved by a device for detecting an incorrectly connected differential pressure sensor with a high and a low pressure connection to an exhaust gas duct of an internal combustion engine in parallel with a particle filter, comprising a sensor interface for acquiring sensor signals from the differential pressure sensor which represent uncorrected values for the differential pressure present at the differential pressure sensor, and a detection facility connected to the sensor interface which receives the sensor signals and executes the method according to the invention on the basis of the sensor signals. In particular, it checks during operation of the internal combustion engine whether according to at least one predefined criterion stable operating conditions are prevailing in the exhaust gas duct, and at least if stable operating conditions are present determines at least one uncorrected differential pressure value representative of the stable operating conditions. With regard to a first detection during operation of the internal combustion engine it checks whether the uncorrected differential pressure representative of the stable operating conditions satisfies a first predefined error criterion for an incorrect connection, and/or with regard to a second detection after the end of operation of the internal combustion engine determines a value for an offset parameter of a characteristic of the differential pressure sensor, depending on the determined offset parameter value and the uncorrected differential pressure value representative of the stable operating conditions determines a corrected minimum differential pressure value and checks whether the corrected minimum differential pressure value satisfies a second predefined error criterion for an incorrect connection.

The invention can be used for any internal combustion engines and particle filters, preferably for diesel engines having at least one particle filter located in the exhaust gas duct of the diesel engine concerned.

The method and the device can also be used with any differential pressure sensors, which within the scope of the present invention are understood to include any sensors which sense a pressure difference between a high and a low pressure connection of the sensor and deliver a sensor signal representing the pressure difference or the differential pressure. In this situation, the differential pressure sensor has one preferably linear characteristic which exhibits an offset, in other words a generally non-disappearing value for the sensor signal at a differential pressure of 0 bar, which is represented by the offset parameter. In this situation, a positive value results for the acquired pressure difference according to the characteristic of the sensor only if the differential pressure present at the sensor, in other words between the high and the low pressure connection, is positive, in other words the pressure at the high pressure connection is greater than at the low pressure connection. As already described in the introduction, the terms high and low pressure connection do not imply that a quantitatively high or low pressure must be present at them.

The differential pressure in this situation is particularly also understood to be each variable or each signal which uniquely represents the differential pressure. In this situation, the uncorrected differential pressure value is in particular the raw differential pressure value or the differential pressure value which results from the sensor signal from using the characteristic with a predefined, not yet updated and thus not necessarily currently relevant offset parameter value, or the uncorrected sensor signal itself. The corrected differential pressure, on the other hand, is a differential pressure which is corrected in respect of the current offset.

For acquiring the sensor signals the control facility has at its disposal the sensor interface which in the simplest case can be a sensor signal input. The control facility can often also include further components and/or a software interface in addition to the sensor signal input.

The invention detects reversed high and low pressure connections on the exhaust gas duct, whereby the drifting offset parameter value and imprecise measurement at negative differential pressures are avoided.

The differential pressure values are acquired under stable operating conditions in the exhaust gas duct or during stable operating states of the internal combustion engine. Stable operating conditions are understood to include particularly such operating conditions whereby an essentially constant differential pressure is present between exhaust gas inlet and exhaust gas outlet of the particle filter. Furthermore, a differential pressure other than zero is preferably present during stable operating conditions, in other words the internal combustion engine has a possibly slight but non-disappearing load. The predefined criterion, which in particular can affect the extent of timing variations for parameters, is used for detecting such operating conditions or states. The use of such differential pressure values has the advantage that changes in the differential pressure present at the sensor or between the high and the low pressure connections which are caused by changes in the operating state of the internal combustion engine, for example during acceleration, do not or do not substantially play a part in the detection of a reversed connection. Furthermore, it can be assumed that given stable operating conditions or operating states the differential pressure values vary only a little, in other words in a scope allowed by the predefined criterion.

During operation, only uncorrected differential pressure values or raw differential pressure values which are not subjected to any correction in respect of the current offset are acquired and if need be stored. This has the advantage that inaccuracies in the value of the offset parameter play no role in the detection of an incorrect connection.

When the stable operating conditions or operating states are present, at least one uncorrected differential pressure value representative of the stable operating conditions is then determined. In this situation, the differential pressure value representative of the stable operating conditions can for example be given by a maximum or minimum uncorrected differential pressure value in a predefined acquisition time interval or a mean value for the acquired uncorrected differential pressure values in the predefined acquisition time interval.

On the basis of this uncorrected differential pressure value representative of the stable operating conditions, two different detections can then be performed.

On the one hand, during operation of the internal combustion engine a check can be made with regard to the first detection using the first error criterion for an incorrect connection as to whether a reversal of the connections is present. The error criterion in question is preferably a threshold value criterion whereby the threshold value can be chosen depending on the expected drift of the offset parameter value, the variations in the differential pressure expected in the case of stable operating conditions and the differential pressures typically occurring during operation. In particular, the error criterion can consist in the fact that a reversal is determined if the differential pressure value representative of the stable operating conditions does not reach a predefined, for example negative, threshold value. This first detection has the advantage that it can actually be performed during operation of the internal combustion engine and without precise knowledge of the current offset parameter value.

On the other hand, after the end of operation of the internal combustion engine a current offset parameter value can initially be determined with regard to the second detection by acquiring sensor signals when the internal combustion engine is at a standstill and determining the current offset parameter value as a function of the sensor signals. Depending on the determined uncorrected differential pressure representative of the stable operating conditions and the current offset parameter value, a corrected minimum differential pressure is then determined using an offset correction by eliminating the influence of the offset parameter value. The formulation whereby the corrected minimum differential pressure is determined depending on the determined uncorrected differential pressure value representative of the stable operating conditions and the determined current offset parameter value means here that further values or variables can in the appropriate circumstances also be incorporated in the determination.

Influences of an unknown or drifting offset of the characteristic are thereby reduced or preferably eliminated, which has the advantage that a corrected and therefore very precise value for the minimum differential pressure value is available for the following check of the second error criterion and an incorrect connection can thus also be ascertained even in the case of only slight differential pressures. Since the determination of the offset parameter value takes place on the basis of data from stable operating conditions, the determined value is very reliable. By preference, a plausibility check can additionally take place on whether or not the operating conditions used are typical according to a predefined criterion and thus meaningful. In this case, further usage occurs only if the value has been determined under typical conditions.

With regard to the second error criterion, as in the case of the first error criterion this can be a threshold value criterion, for which however a different threshold value is used since a correction has already been performed for the influence of the offset. The threshold value can in particular be chosen depending on the differential pressures representative of the stable operating conditions, which are to be expected during operation. One advantage of this error criterion consists in the fact that it is also particularly reliable in the case of only very short operating cycles. Furthermore, the influence of the offset can be very largely eliminated, with the result that the same method can be reliably used even in the case of widely differing offsets of different differential pressure sensors.

In this situation it is basically possible to perform only one of the first and the second detections. By preference, however, both detections are performed, which has the advantage that a particularly reliable and fast detection thus results even under very different operating conditions.

The result of the check of the first and/or second error criterion can in particular be stored. Furthermore, an error signal is output preferably at least on detection of an error.

The method can be executed with the device which for this purpose has the sensor signal interface and, connected to the sensor signal interface, the detection facility which is designed for executing the method.

It is basically conceivable that the device and in particular the detection facility are implemented by a corresponding, non-programmable circuit. With regard to the device, it is however preferable for the detection facility to have a memory in which data and instructions for a computer program used for the first and the second error checks are stored, and a processor which executes the method according to the invention when executing the instructions. This embodiment has the advantage that the device can be realized by a control unit for controlling the internal combustion engine, in particular an engine control unit or engine controller in which for this purpose a corresponding computer program or corresponding program modules can be stored, which is/are executed by a microprocessor in the control unit. The control unit in any case frequently has at its disposal the sensor interface because it checks the state of the particle filter. It is then advantageously possible to reach the device only by means of corresponding programming of the control unit, whereby the control unit can still simultaneously exercise its usual functions. The offset parameter value determined during the method can then immediately be stored for use during further operating cycles of the internal combustion engine and can be used by other software modules.

A further subject matter of the invention is therefore also a computer program for checking a correct connection of a differential pressure sensor with a high and a low pressure connection to an exhaust gas duct of an internal combustion engine in parallel with a particle filter, which includes instructions during execution of which a data processing facility with a sensor interface for acquiring sensor signals, which represent uncorrected differential pressure values present at the differential pressure sensor, executes the method according to the invention in response to sensor signals from the differential pressure sensor, and in particular during operation of the internal combustion engine a check is made as to whether stable operating conditions prevail according to at least one predefined criterion, and at least given the presence of stable operating conditions determines at least one uncorrected differential pressure value representative of the stable operating conditions from sensor signals of the differential pressure sensor, and with regard to a first detection during operation of the internal combustion engine checks whether the uncorrected differential pressure representative of the stable operating conditions satisfies a first predefined error criterion for an incorrect connection, and/or with regard to a second detection after the end of operation of the internal combustion engine determines a value of an offset parameter of a characteristic of the differential pressure sensor, depending on the determined offset parameter value and the uncorrected differential pressure value representative of the stable operating conditions determines a corrected minimum differential pressure value, and checks whether the corrected minimum differential pressure value satisfies a second predefined error criterion for an incorrect connection.

Furthermore, the subject matter of the invention is also a computer-readable data medium on which the computer program according to the invention is stored. Magnetic, magneto-optical or optical data media or nonvolatile storage elements, for example flash ROM or EEPROM components, in particular can be considered as data media.

In principle it is sufficient with regard to the method for only one time interval to be determined during which stable operating conditions prevail, and for the differential pressure values determined during the time interval to be used. For example, on the basis of a differential pressure at a predefined point in time a time interval can be determined in which the differential pressure varies little according to the predefined criterion for the presence of stable operating conditions and in this respect stable operating conditions are present. If the time interval is sufficiently long, the differential pressure values acquired within it can be used with regard to the method. For the method it is however preferable that during operation of the internal combustion engine in a plurality of successive time intervals the check for the presence of stable operating conditions and at least given the presence of stable operating conditions the determination of the uncorrected differential pressure value representative of the stable operating conditions are performed in each case for the respective time interval. To this end the detection facility of the device is preferably designed such that, and the computer program preferably contains such instructions, during operation in a plurality of successive time intervals the check for the presence of stable operating conditions and at least given the presence of stable operating conditions the determination of the uncorrected differential pressure value representative of the stable operating conditions are performed in each case for the respective time interval. This embodiment has the advantage that the determination of the uncorrected differential pressure values representative of the stable operating conditions can take place separately for each time interval, with the result that a larger and thus more reliable database is available for the subsequent first and/or second detection. The lengths of the time intervals are preferably predefined such that a plurality of differential pressure values can be acquired in them, with the result that a reliable check for stable operating conditions is possible.

The lengths of the time intervals can be predefined as desired in this situation, but they are preferably of the same length. This has the advantage that the check for the presence of stable operating conditions can be performed more simply and a repeated determination of the uncorrected differential pressure value representative of the stable operating conditions is facilitated. Moreover, the determined uncorrected differential pressure values representative of the stable operating conditions can be better compared because they each represent time intervals of equal length.

If a check for the presence of stable operating conditions and the acquisition of uncorrected differential pressure values take place in a plurality of time intervals, it is preferable with regard to the method that the first error check is performed in respect of the first detection for each of the time intervals with stable operating conditions, and that in the case of an error confirmation check a third error criterion, as whether an error according to the first error criterion has been ascertained in at least two time intervals with stable operating conditions, is checked. To this end the detection facility of the device is preferably designed such that, and the computer program preferably contains such instructions, during checking for the presence of stable operating conditions and acquisition of uncorrected differential pressure values in a plurality of time intervals the first error check is performed during the first detection for each of the time intervals with stable operating conditions, and that in an error confirmation check a third error criterion is checked as to whether an error according to the first error criterion has been ascertained in at least two time intervals with stable operating conditions. This embodiment has the advantage that any error detections caused by statistical measurement errors in the differential pressure values under unfavorable operating conditions and which are therefore irrelevant can be singled out. An error and thus a reversed connection will only be recognized if the first error detection has detected an error in two time intervals with stable operating conditions and thus the first detection of the error is confirmed by the second. It is preferably required that an error be recognized in more than two time intervals with stable operating conditions. Alternatively, a check can preferably be made as to whether the two error detections occurred in time intervals with stable operating conditions which are separated by not more than a predefined period of time. The period of time preferably comprises about 5 to 10 time intervals. An error signal or the result of checking the error confirmation criterion can then be generated or saved instead of the error signals or the check results for the individual time intervals. For this embodiment, the result of the first error detection is preferably stored for at least as many time intervals as are required in order to satisfy the third error criterion.

The check for the presence of stable operating conditions and acquisition of uncorrected differential pressure values in a plurality of time intervals is however also advantageous for the second error detection. With regard to the method whereby a check for the presence of stable operating conditions and acquisition of uncorrected differential pressure values takes place in a plurality of time intervals, the uncorrected differential pressure values representative of the stable operating conditions are preferably used during the second detection in order to determine the corrected minimum differential pressure value for the time intervals with stable operating conditions. The detection facility of the device is preferably designed such that, and the computer program preferably contains such instructions, when a check for the presence of stable operating conditions and acquisition of uncorrected differential pressure values takes place in a plurality of time intervals, the uncorrected differential pressures representative of the stable operating conditions are used during the second detection in order to determine the corrected minimum differential pressure for the time intervals with stable operating conditions. This embodiment has the advantage that a more precise error detection is possible with the second error detection as result of the broader database.

By preference, a global minimum differential pressure value which represents a global minimum differential pressure is determined in the method from the uncorrected differential pressure values representative of the stable operating conditions for the time intervals with stable operating conditions, and the corrected minimum differential pressure is determined from the global minimum differential pressure value using the determined offset parameter value. The global minimum differential pressure value can for example be determined as the minimum of all uncorrected differential pressure values representative of the stable operating conditions for the time intervals with stable operating conditions. The global minimum differential pressure value however only needs to represent the global minimum differential pressure. It is therefore also possible to use a mean value of N smallest of the uncorrected differential pressure values representative of the stable operating conditions, where N is a natural number. It is thus possible to average out statistical errors. The determination of the global minimum differential pressure value has the advantage, particularly when the global minimum differential pressure value is determined as the minimum of the uncorrected differential pressure values representative of the stable operating conditions, that this permits a reliable detection of a reversed connection.

With regard to the method, it is furthermore preferable if an error signal is output depending on the result of at least one of the error checks or of the error confirmation check. To this end the device can preferably have available an output interface, which can be a hardware and/or software interface, and to this end the detection facility of the device is preferably designed such that, and the computer program preferably contains such instructions, an error signal is output depending on the result of at least one of the error checks. In particular, the type of the error detection that has recognized the error can be represented by the error signal. This embodiment has the advantage that a simple diagnosis of the installation state of the sensor is possible. Furthermore, with regard to the method the error signal can be output according to the demands on the reliability and sensitivity of the detection if the first or the second or the third error criterion is satisfied, or if both the first and also the second detection have ascertained an error, in other words reversed hose connections.

The presence of stable operating conditions can be recognized in different ways. In this situation, the possible variants can be used as alternatives or cumulatively, or in conjunction with one another. According to a first variant, in order to check the presence of stable operating conditions the criterion consists in checking whether the variation in the acquired uncorrected differential pressure values according to a predefined constancy criterion is sufficiently small. The detection facility is preferably designed for this purpose. This embodiment has the advantage that the directly relevant operating parameters, namely the pressure of the exhaust gas upstream and downstream close to the particle filter, are used. When using a plurality of time intervals, a check is performed for each time interval. As a measure of the variation, it is for example possible to determine the standard deviation and compare it with a limit value. By particular preference, however, a check is made as to whether the minimum and the maximum uncorrected differential pressures agree according to a predefined constancy criterion. In this situation, the constancy criterion can particularly make use of the fact that the difference between the maximum and the minimum uncorrected differential pressures is less than a predefined limit value. The latter can in particular be chosen according to the measuring precision of the sensor and the statistical pressure variations to be expected even under stable operating conditions. This embodiment has the advantage that the checking can take place very quickly.

It is not however absolutely necessary to use properties of the exhaust gas itself for the detection of stable operating conditions. Thus, in a further preferred variant of the method, for checking for the presence of stable operating conditions at least one value of at least one parameter or a variable which at least partially represent the operating state of the internal combustion engine or of other facilities in the exhaust gas duct upstream of the particle filter is acquired and the value used during checking of the criterion. To this end, the device preferably has an interface with an engine controller of the internal combustion engine, and the detection facility acquires signals from the engine controller over the interface which represent at least one value of at least one parameter or a variable, which at least partially represent the operating state of the internal combustion engine or of other facilities in the exhaust gas duct upstream of the particle filter, and uses the at least one value for checking the presence of stable operating conditions. To this end the computer program is preferably provided with instructions in response to which, when executing the program for checking the presence of stable operating conditions, at least one value of at least one parameter or a variable, which at least partially represent the operating state of the internal combustion engine or of other facilities in the exhaust gas duct upstream of the particle filter, is acquired and the value used during checking of the criterion. This variant has the advantage that values for such parameters and variables are in any case available in the engine controller for modern internal combustion engines and the properties of the exhaust gas stream are largely defined by the operating state of the internal combustion engine and how this state changes. No further sensors are therefore necessary. In particular, in order to detect the stable operating state a time characteristic for the at least one parameter or the at least one variable can be acquired and used for the detection process. With regard to the interface, this can in particular be a software interface if the device is integrated into the engine controller. It is also the case with this variant that the acquisition of the values for the parameter or the variable can preferably be performed in each time interval when a plurality of time intervals is used. The criterion used can preferably consist in the fact that the variation in the values for the at least one parameter or the at least one variable for the time interval is less than a limit value predefined as a function of the parameter or the variable. The variation can be determined as in the case of using the differential pressure value. The criterion can however also incorporate the simultaneous checking of a plurality of operating parameters of the internal combustion engine for variations, with regard to which different limit values can be used and stable operating conditions recognized only if all checks yield sufficiently small variations.

The minimum differential pressure can for example be used as the uncorrected differential pressure representative of the stable operating conditions. It is however preferable that in order to determine the uncorrected differential pressure representative of the stable operating conditions the respective maximum uncorrected differential pressure is determined and is used as the uncorrected differential pressure representative of the stable operating conditions. With regard to the device, to this end the detection facility is designed so as to determine the respective maximum uncorrected differential pressure and use this as the uncorrected differential pressure representative of the stable operating conditions for determining the uncorrected differential pressure representative of the stable operating conditions. Furthermore, the computer program preferably contains instructions in order to determine the respective maximum uncorrected differential pressure and to use it as the uncorrected differential pressure representative of the stable operating conditions for determining the uncorrected differential pressure representative of the stable operating conditions. The use of the maximum uncorrected differential pressure has the advantage that this, particularly if it should be negative, can be acquired with greater accuracy than the minimum uncorrected differential pressure.

The offset parameter value can be determined after termination of operation of the internal combustion engine in any desired, in particular already known, manner. The preferred option is to store the determined offset parameter value, which has the advantage that the latter is available in the next operating cycle, even if no error has been ascertained. In this situation the offset parameter value can, apart from directly after exchanging the sensor, be determined as a floating mean value over a plurality of operating cycles, as a result of which its accuracy is advantageously increased.

BRIEF DESCRIPTION OF THE DRAWINGS

The invention will be described further by way of example in the following with reference to the drawings. In the drawings.

DETAILED DESCRIPTION

Figure 1:
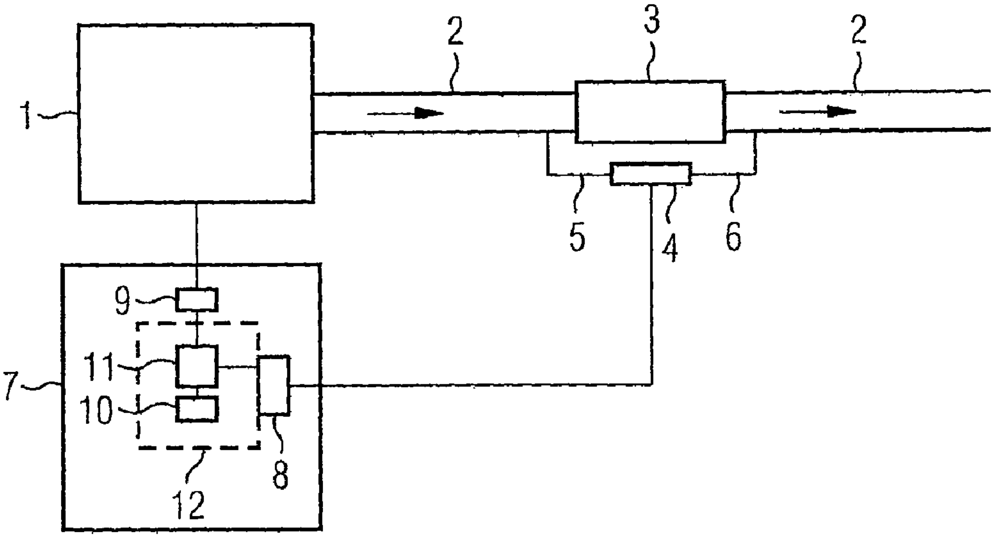
FIG. 1 shows a schematic representation of an internal combustion engine with an exhaust gas duct.

In FIG. 1 an internal combustion engine 1, a diesel engine in the example, is connected to an exhaust gas duct 2 which takes away exhaust gases produced by the internal combustion engine during operation. A normal particle filter 3 which filters particles out of the exhaust gas from the internal combustion engine 1 is located in the exhaust gas duct 2. Connected in parallel with the particle filter 3 is a differential pressure sensor 4 with its high pressure connection 5 close to the particle filter 3 connected to the exhaust gas duct 2 upstream of the particle filter 3 and with a low pressure connection 6 close to the particle filter 3 connected to the exhaust gas duct 2 downstream of the particle filter 3, such that the particle filter 3 can sense a drop in pressure in the exhaust gas stream across the particle filter 3 or a differential pressure generated by the particle filter 3 and can generate corresponding sensor signals.

The differential pressure sensor 4 is connected to an engine controller, in other words an engine control unit 7, which serves partly as a device for detecting an errored connection of the particle filter 3 to the exhaust gas duct 2, particularly a reversed hose or reverse connection, and partly for controlling the internal combustion engine 1. For the sake of clarity, the signal connections and facilities used solely for controlling the internal combustion engine 1 are not shown in the figures.

When the internal combustion engine 1 is running this generates fine particles, particularly soot particles in the exhaust gas, which are filtered out of the exhaust gas by the particle filter 3. The particles filtered out remain in the particle filter 3 and increase the flow resistance of the particle filter 3 as the total running time increases. This has two consequences: Firstly, the particle filter 3 must be cleaned after a certain time, in other words the particles which have accumulated in the particle filter must be removed. The state of the particle filter 3 should be determined as precisely as possible in order to minimize the frequency required for cleaning. Secondly, the changing flow resistance generates a drop in pressure, changing with regard to the same exhaust gas stream, across the particle filter 3, which can be sensed by the differential pressure sensor 4 and can be used in order to diagnose the particle filter 3.

Figure 2:
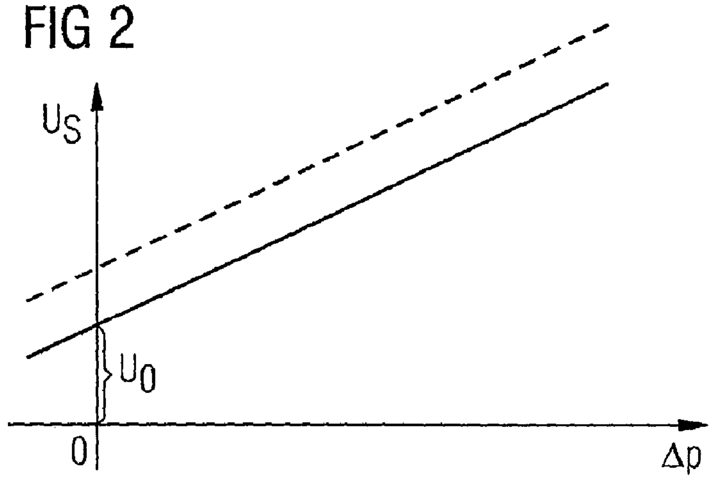
FIG. 2 shows a schematic representation of a characteristic of the differential pressure sensor in FIG. 1.

The differential pressure sensor 4 senses the pressure difference or the differential pressure present at the sensor, in other words the differential pressure between its high pressure connection 5 and its low pressure connection 6, and generates a corresponding sensor signal. An example of a characteristic of the differential pressure sensor 4, in other words the relationship between sensor signal voltage $U_s$ and differential pressure $\Delta p$ present at the sensor 4 is shown in FIG. 2. The characteristic is linear to a good approximation and has an offset $U_0$ at a differential pressure $\Delta p$ of 0 bar. Depending on an age-related drift the value of the offset can change, as in indicated in FIG. 2 by the dashed line. In the case of a negative differential pressure, in other words if the pressure at the high pressure connection 5 is less than at the low pressure connection 6, the measurement becomes very imprecise. It is therefore important for correct functioning of the differential pressure sensor 4 in the system shown in FIG. 1 that the differential pressure sensor 4 is in actual fact connected correctly to the exhaust gas duct 2 in parallel with the particle filter 3, in other words with the high pressure connection 5 connected to the exhaust gas duct 2 upstream of the particle filter 3 and the low pressure connection 6 connected to the exhaust gas duct 2 downstream of the particle filter 3.

In addition to controlling the internal combustion engine 1, the engine control unit 7 serves to evaluate the sensor signals from the differential pressure sensor 4 and therefore has a sensor interface 8 to which is connected a signal output from the differential pressure sensor 4. The engine control unit 7 also has an interface 9 with electrical facilities of the internal combustion engine, a storage facility 10 with a volatile and a non-volatile memory and, connected to the storage facility 10, a processor 11 which executes a computer program stored in the non-volatile memory of the storage facility 10 according to a first preferred embodiment of the invention.

On the one hand, the computer program includes code for controlling the internal combustion engine which is assumed to be known and is therefore not described further in the following.

The computer program also includes instructions for executing a method for detecting an incorrect connection of the differential pressure sensor 4 with a high and a low pressure connection 5 and 6 respectively connected to the exhaust gas duct 2 of the internal combustion engine 1 in parallel with the particle filter 4, in particular a reversal of the connections, according to a first preferred embodiment of the invention. The engine control unit 7 therefore also constitutes a device for detecting an incorrect connection of the differential pressure sensor 4 with a high and a low pressure connection 5 and 6 respectively connected to the exhaust gas duct 2 of the internal combustion engine 1 in parallel with the particle filter 4 according to a first preferred embodiment of the invention. In this situation, the processor 11 with the storage facility 10 constitutes a detection facility 12 connected to the interfaces 8 and 9, which processes sensor signals of the differential pressure sensor 4 and checks the check for the correct connection of the differential pressure sensor 4.

Figure 4:
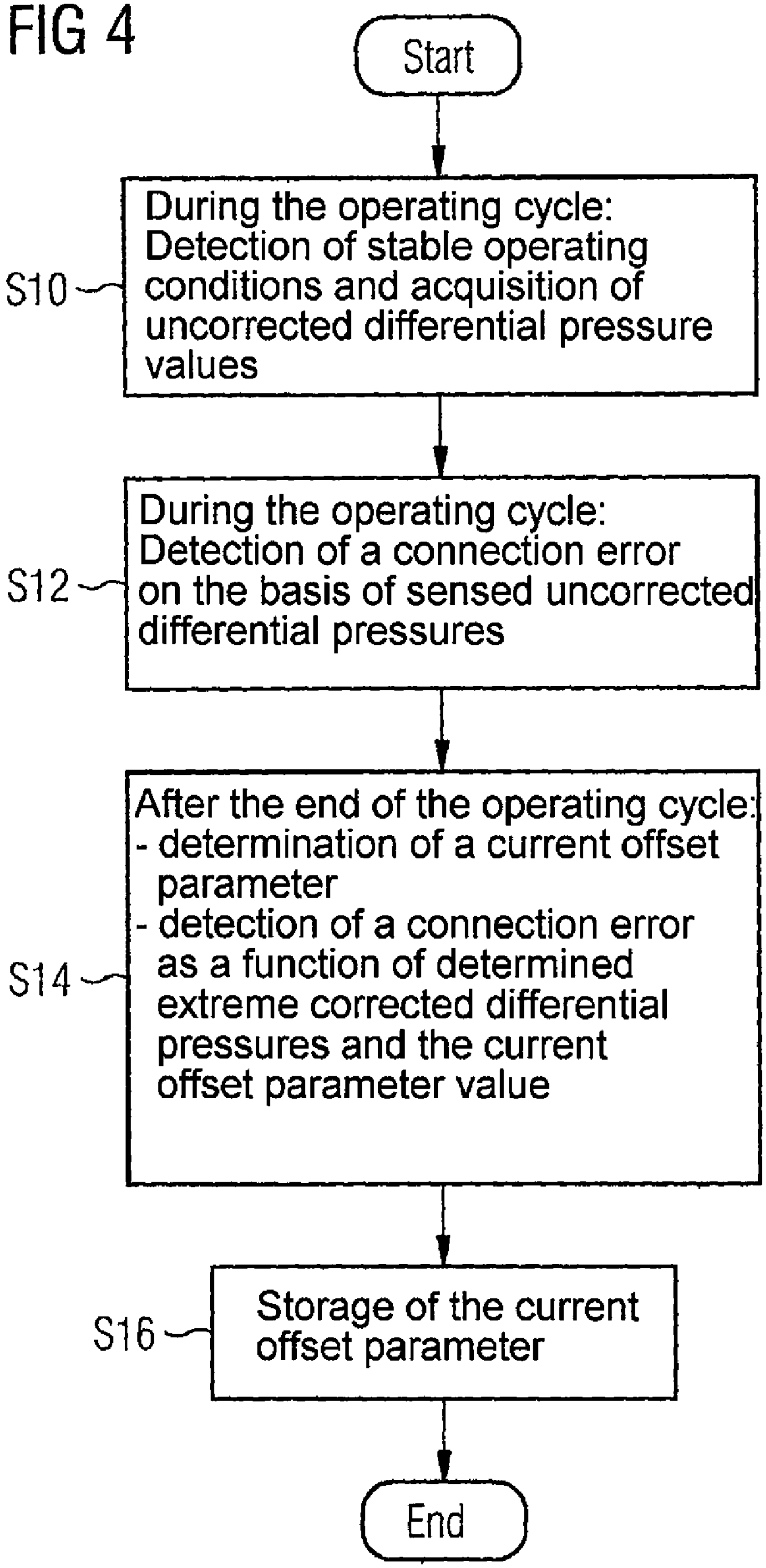
FIG. 4 shows a greatly simplified flowchart for a method for checking a correct connection of the differential pressure sensor to the exhaust gas duct in FIG. 1.

The method executed by the device, or more precisely by the detection facility 12 and the processor 11 therein, is illustrated schematically and greatly simplified in FIG. 4. It can be subdivided into three sections S10, S12 and S14.

In the first section S10, after the internal combustion engine 1 has started, uncorrected differential pressures are sensed in successive time intervals while it is running and a check is made as to whether stable operating conditions are present in the exhaust gas duct.

In the second section S12, a first detection of a connection error, in other words a reversal of the connections between exhaust gas duct 2 and high and low pressure connections 5 and 6 respectively, takes place using the uncorrected differential pressure values acquired in section S10 by means of the differential pressure sensor 4.

In the third section S14, which is executed after the end of the operating cycle, there occur a determination of a current offset parameter value and a second detection of a connection error as a function of the current offset parameter value and uncorrected differential pressure values representative of the stable operating conditions, which were determined in section S12.

More precisely, in the first section S10 uncorrected differential pressure values are first acquired at predefined time intervals. To this end, in the present embodiment the differential pressures are sensed at constant time spacings, such that the time intervals are given by a predefined number of successively sensed differential pressures. In other embodiments the time intervals can also be determined by a timer. The length $\Delta t$ of the time intervals preferably lies between 1 and 10 seconds. In this embodiment the length of a time interval is about 8 seconds, within which for example 100 differential pressure values are acquired from corresponding sensor signals from the differential pressure sensor 4. As these values are not initially subjected to any correction, they are referred to as uncorrected differential pressure values.

The following operations are executed for all time intervals during operation of the internal combustion engine.

After a time interval has passed and thus after the differential pressure values have been acquired, a check is made for the time interval as to whether stable operating conditions prevailed in this time interval according to at least one predefined criterion. Under stable operating conditions there should be no or only very slight variations in the uncorrected differential pressure values occurring in a time interval. In this embodiment, the minimum and the maximum uncorrected differential pressure values $\Delta p_{min}$ and $\Delta p_{max}$ respectively are hence determined for the time interval. The criterion then checked is whether the variations in the uncorrected differential pressure values are less than a predefined limit value $\delta$ which can be chosen for example depending on the properties of the internal combustion engine and of the exhaust gas duct and also the sensitivity and the noise of the differential pressure sensor 4. To this end, a more precise check is made as to whether the following equation is true $$\Delta p_{max} - \Delta p_{min} < \delta.$$

If this criterion is satisfied, sufficiently stable operating conditions prevailed during the time interval and the differential pressure values can be used for the first detection.

To this end, and in preparation for the second detection, in section S12 an uncorrected differential pressure value $\Delta p_{rep}$ representative of the stable operating conditions is then determined for the time interval; in the present embodiment the maximum uncorrected differential pressure $\Delta p_{max}$ is used as the uncorrected differential pressure $\Delta p_{rep}$ representative of the stable operating conditions.

With regard to the first detection during operation of the internal combustion engine 1 a check is now made as to whether the uncorrected differential pressure $\Delta p_{rep}$ representative of the stable operating conditions satisfies a first predefined error criterion for an incorrect connection. In the present embodiment, a threshold value criterion is used as the error criterion which is checked as to whether the uncorrected differential pressure value representative of the stable operating conditions fails to reach a predefined first threshold value $S_1$:

$$\Delta p_{rep} < S_1.$$

In this situation, the threshold value $S_1$ is chosen depending on an expected standard offset parameter value of the sensor 4 and on differential pressures to be expected during operation and can in particular be negative.

If the error criterion is satisfied, a corresponding error value is stored in the storage facility 10 for the time interval. If no stable operating conditions were recognized or if the error criterion was not satisfied, no error value or an error value indicating no error is stored.

After that, in an error confirmation check a check is made according to a third error criterion as to whether an error was recognized for a predefined number of time intervals. Only in this case will an incorrect connection or a connection error be recognized for the first detection. In this situation the number is chosen such that errors which are recognized only randomly and thus erroneously do not result in the generation of an error signal. In the example, the number 10 can be chosen as the number for example.

If the third error criterion is satisfied, in other words the error is recognized again or confirmed sufficiently often, a corresponding error signal is generated and the occurrence of an error is recorded by saving a corresponding value in the storage facility 10. Both the error signal and also the stored value reflect the fact that the error was found during the first detection.

Figure 3:
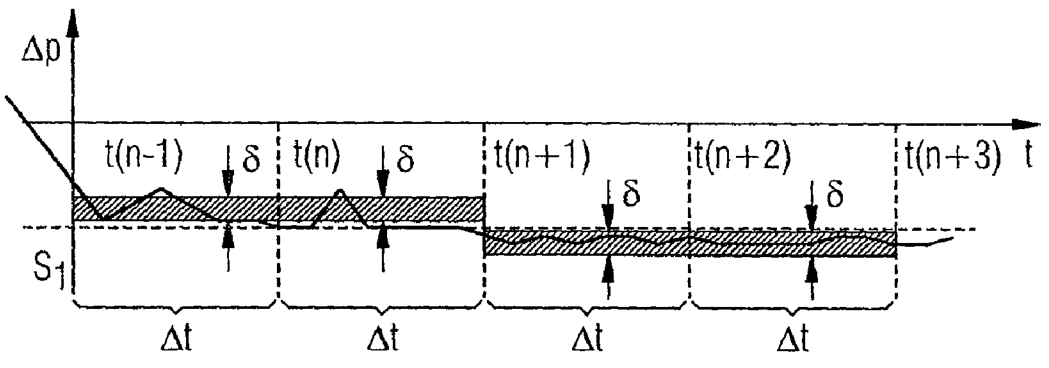
FIG. 3 shows a diagram with a time characteristic of differential pressure values generated during operation of the internal combustion engine in FIG. 1.

The characteristic of the uncorrected differential pressure, the detection of a stable operating state and the threshold value criterion are illustrated in FIG. 3 by way of an example. The detected uncorrected differential pressures change according to the operating state. Whereas variations occur in the time intervals between t(n) and t(n−1) and also t(n+1) and t(n) which indicate no stable operating state, the variation in the time intervals between t(n+2) and t(n+1) and also t(n+3) and t(n+2) fails to reach the limit value $\delta$, indicated by hatching, such that stable operating conditions are present in these time intervals. In these intervals the representative uncorrected differential pressure values also fail to reach the threshold value $S_1$.

While the internal combustion engine is running, the device continuously checks in parallel whether operation of the internal combustion engine has been terminated.

After the end of the operating cycle of the internal combustion engine 1, in the third section S14 the second detection is performed in which a current value is determined for the offset parameter of the characteristic of the differential pressure sensor 4, a corrected minimum differential pressure value is determined depending on the offset parameter value determined and the uncorrected differential pressure value representative of the stable operating conditions, and a check is made as to whether the corrected minimum differential pressure value satisfies a second predefined error criterion for an incorrect connection, in particular a reversal of connections.

To this end, the sensor signal from the differential pressure sensor 4, which represents the uncorrected differential pressure and should correspond to the differential pressure 0 bar then present at the sensor 4, is sensed and the current offset parameter value is set to this value.

In the following step, a global minimum uncorrected differential pressure value is determined as a minimum of the uncorrected differential pressure values representative of the stable operating conditions for all time intervals with stable operating conditions.

This global minimum uncorrected differential pressure value is then corrected using the determined current offset parameter value and the characteristic of the differential pressure sensor 4, which results in a corrected minimum differential pressure value $\Delta p_{korr,min}$.

This corrected minimum differential pressure value $\Delta p_{korr,min}$ is used in the second error criterion, whereby in the present embodiment this is a threshold value criterion. More precisely, a check is made as to whether the condition $$\Delta p_{korr,min} < S_2$$

with a predefined threshold value $S_2$ is satisfied. If this is the case, an error signal is generated and a corresponding error value is stored in the storage facility 10.

Moreover, in step S16 the determined current offset parameter value is stored in the non-volatile memory of the storage facility 10 so that it can be used in the next operating cycle.

Using the error signals which for example are output on a display or are delivered to a diagnostic system, a mechanic can easily discover a reversal of connections and ensure that correct connections are made.

The detection can take place very quickly in the case of only short operating cycles, and also very reliably in the case of only a small load, whereby apart from the computer program no additional facilities are required.

A further preferred embodiment differs from the first embodiment in that differential pressure values are represented by levels of the sensor signals and are also processed as such.

In another preferred embodiment, in order to determine the current offset parameter value a plurality of sensor signals is acquired and the offset parameter value is determined by averaging.

Yet another embodiment differs from the first embodiment in that the mean value of the acquired uncorrected differential pressure values is used as the uncorrected differential pressure value representative of the stable operating conditions in the respective time interval.

A further preferred embodiment differs from the first embodiment with regard to the detection of stable operating conditions. To this end a software interface, not shown in FIG. 1, with the engine control software for operating and control parameters for the internal combustion engine is provided in the detection facility.

It is then not the variation of the uncorrected differential pressure values in the time interval which is checked but the variation of at least one operating and control parameter. In particular, the air and fuel quantities fed to the internal combustion engine can for example be checked as operating and control parameters, for which purpose a partial criterion, again the failure of the width of variation to reach predefined limit values, is provided for each of the parameters and stable operating conditions are only ascertained when both partial criteria are satisfied. The partial criteria correspond to the criterion in the first embodiment, whereby different limit values are however chosen.

A further preferred embodiment of the invention differs from the first embodiment with regard to the determination of the global minimum differential pressure value. The latter is determined as the mean value of the lowest five of the uncorrected differential pressure values representative of the stable operating conditions for all time intervals with stable operating conditions. In this way, statistical errors in the determination can be reduced, which advantageously permits a more precise check even under a low load.

What is claimed is:

1. A method for detecting an incorrectly connected differential pressure sensor with a high and a low pressure connection to an exhaust gas duct of an internal combustion engine in parallel with a particle filter in the exhaust gas duct, comprising the steps of:

during operation of the internal combustion engine, checking as to whether according to at least one predefined criterion stable operating conditions are prevailing, and at least if stable operating conditions are present, determining at least one uncorrected differential pressure value representative of the stable operating conditions from sensor signals of the differential pressure sensor, and wherein with regard to a detection a check is made during operation of the internal combustion engine as to whether the uncorrected differential pressure value representative of the stable operating conditions satisfies a predefined error criterion for an incorrect connection.

2. The method as claimed in claim 1, wherein during operation of the internal combustion engine in a plurality of successive time intervals the check for the presence of stable operating conditions and at least given the presence of stable operating conditions the determination of the uncorrected differential pressure value representative of the stable operating conditions are performed in each case for the respective time interval.

3. The method as claimed in claim 2, wherein a first error check is performed in respect of a first detection for each of the time intervals with stable operating conditions, and whereby in the case of an error confirmation check a third error criterion is checked as to whether an error according to the predefined error criterion has been ascertained in at least two time intervals with stable operating conditions.

4. The method as claimed in claim 3, wherein an error signal is output depending on the result of at least one of the error checks or of the error confirmation check.

5. The method as claimed in claim 1, wherein in order to check the presence of stable operating conditions the criterion consists in checking whether the variation in the acquired uncorrected differential pressure values according to a predefined constancy criterion is sufficiently small.

6. The method as claimed in claim 1, wherein for checking for the presence of stable operating conditions at least one value of at least one parameter or a variable, which at least partially represent the operating state of the internal combustion engine or of other facilities in the exhaust gas duct upstream of the particle filter, is acquired and the value used during checking of the criterion.

7. A device for detecting an incorrectly connected differential pressure sensor with a high and a low pressure connection to an exhaust gas duct of an internal combustion engine in parallel with a particle filter in the exhaust gas duct, comprising a sensor interface for acquiring sensor signals from the differential pressure sensor, which represent uncorrected values for the differential pressure present at the differential pressure sensor, and a detection facility connected to the sensor interface which receives the sensor signals and, on the basis of the sensor signals, checks during operation of the internal combustion engine whether according to at least one predefined criterion stable operating conditions are prevailing in the exhaust gas duct, and at least if stable operating conditions are present determines at least one uncorrected differential pressure value representative of the stable operating conditions, and with regard to a first detection during operation of the internal combustion engine checks whether the uncorrected differential pressure representative of the stable operating conditions satisfies a predefined error criterion for an incorrect connection.

8. The device as claimed in claim 7, wherein the detection facility has a memory in which data and instructions for a computer program used for the error checks are stored, and comprises a processor which executes the instructions to perform error checks.

9. The device as claimed in claim 7, wherein the detection facility is designed such that during operation in a plurality of successive time intervals the check for the presence of stable operating conditions and at least given the presence of stable operating conditions the determination of the uncorrected differential pressure value representative of the stable operating conditions are performed in each case for the respective time interval.

10. The device as claimed in claim 9, wherein the detection facility is designed such that during checking for the presence of stable operating conditions and acquisition of uncorrected differential pressure values in a plurality of time intervals the first error check is performed during the first detection for each of the time intervals with stable operating conditions, and that in an error confirmation check a third error criterion is checked as to whether an error according to the predefined error criterion has been ascertained in at least two time intervals with stable operating conditions.

11. The device as claimed in claim 9, wherein the detection facility is designed such that the uncorrected differential pressure values representative of the stable operating conditions are used during the second detection in order to determine the corrected minimum differential pressure value for the time intervals with stable operating conditions.

12. The device as claimed in claim 7, wherein the detection facility is designed such that in order to check the presence of stable operating conditions the criterion consists in checking whether the variation in the acquired uncorrected differential pressure values according to a predefined constancy criterion is sufficiently small.

13. The device as claimed in claim 7, comprising an interface to an engine controller of the internal combustion engine, wherein the detection facility acquires signals from the engine controller over the interface which represent at least one value of at least one parameter or a variable, which at least partially represent the operating state of the internal combustion engine or of other facilities in the exhaust gas duct upstream of the particle filter, and uses the at least one value for checking the presence of stable operating conditions.

14. A computer program product comprising computer executable code stored on a computer readable medium, when executed on a computer performing a method for detecting an incorrect connection of a differential pressure sensor with a high and a low pressure connection to an exhaust gas duct of an internal combustion engine in parallel with a particle filter in the exhaust gas duct, the method comprising the steps of:

during operation of the internal combustion engine, checking as to whether according to at least one predefined criterion stable operating conditions are prevailing, and at least if stable operating conditions are present, determining at least one uncorrected differential pressure value representative of the stable operating conditions from sensor signals of the differential pressure sensor, wherein with regard to a first detection a check is made during operation of the internal combustion engine as to whether the uncorrected differential pressure value representative of the stable operating conditions satisfies a first predefined error criterion for an incorrect connection, and/or wherein with regard to a second detection after the end of operation of the internal combustion engine a value is determined for an offset parameter of a characteristic of the differential pressure sensor, and a corrected minimum differential pressure value is determined as a function of the determined offset parameter value and the uncorrected differential pressure value representative of the stable operating conditions and a check is made as to whether the corrected minimum differential pressure value satisfies a second predefined error criterion for an incorrect connection.

15. The computer program product as claimed in claim 14, wherein during operation of the internal combustion engine in a plurality of successive time intervals the check for the presence of stable operating conditions and at least given the presence of stable operating conditions the determination of the uncorrected differential pressure value representative of the stable operating conditions are performed in each case for the respective time interval.

16. The computer program product as claimed in claim 15, wherein the first error check is performed in respect of the first detection for each of the time intervals with stable operating conditions, and whereby in the case of an error confirmation check a third error criterion is checked as to whether an error according to the first error criterion has been ascertained in at least two time intervals with stable operating conditions.

17. The computer program product as claimed in claim 14, wherein the uncorrected differential pressure values representative of the stable operating conditions are used during the second detection in order to determine the corrected minimum differential pressure value for the time intervals with stable operating conditions.

18. The computer program product as claimed in claim 14, wherein an error signal is output depending on the result of at least one of the error checks or of an error confirmation check.

19. The computer program product as claimed in claim 14, wherein in order to check the presence of stable operating conditions the criterion consists in checking whether the variation in the acquired uncorrected differential pressure values according to a predefined constancy criterion is sufficiently small.

20. The computer program product as claimed in claim 14, wherein for checking for the presence of stable operating conditions at least one value of at least one parameter or a variable, which at least partially represent the operating state of the internal combustion engine or of other facilities in the exhaust gas duct upstream of the particle filter, is acquired and the value used during checking of the criterion.

21. A method for detecting an incorrectly connected differential pressure sensor with a high and a low pressure connection to an exhaust gas duct of an internal combustion engine in parallel with a particle filter in the exhaust gas duct, comprising the steps of:

during operation of the internal combustion engine, checking as to whether according to at least one predefined criterion stable operating conditions are prevailing, and at least if stable operating conditions are present, determining at least one uncorrected differential pressure value representative of the stable operating conditions from sensor signals of the differential pressure sensor, and wherein with regard to a detection after the end of operation of the internal combustion engine a value is determined for an offset parameter of a characteristic of the differential pressure sensor, and a corrected minimum differential pressure value is determined as a function of the determined offset parameter value and the uncorrected differential pressure value representative of the stable operating conditions and a check is made as to whether the corrected minimum differential pressure value satisfies a predefined error criterion for an incorrect connection.

22. A method for detecting an incorrectly connected differential pressure sensor with a high and a low pressure connection to an exhaust gas duct of an internal combustion engine in parallel with a particle filter in the exhaust gas duct, comprising the steps of:

during operation of the internal combustion engine, checking as to whether according to at least one predefined criterion stable operating conditions are prevailing, and at least if stable operating conditions are present, determining at least one uncorrected differential pressure value representative of the stable operating conditions from sensor signals of the differential pressure sensor, wherein with regard to a first detection a check is made during operation of the internal combustion engine as to whether the uncorrected differential pressure value representative of the stable operating conditions satisfies a first predefined error criterion for an incorrect connection, and wherein with regard to a second detection after the end of operation of the internal combustion engine a value is determined for an offset parameter of a characteristic of the differential pressure sensor, and a corrected minimum differential pressure value is determined as a function of the determined offset parameter value and the uncorrected differential pressure value representative of the stable operating conditions and a check is made as to whether the corrected minimum differential pressure value satisfies a second predefined error criterion for an incorrect connection.

23. The method as claimed in claim 22, wherein the uncorrected differential pressure values representative of the stable operating conditions are used during the second detection in order to determine the corrected minimum differential pressure value for the time intervals with stable operating conditions.

24. A device for detecting an incorrectly connected differential pressure sensor with a high and a low pressure connection to an exhaust gas duct of an internal combustion engine in parallel with a particle filter in the exhaust gas duct, comprising a sensor interface for acquiring sensor signals from the differential pressure sensor, which represent uncorrected values for the differential pressure present at the differential pressure sensor, and a detection facility connected to the sensor interface which receives the sensor signals and, on the basis of the sensor signals, checks during operation of the internal combustion engine whether according to at least one predefined criterion stable operating conditions are prevailing in the exhaust gas duct, and at least if stable operating conditions are present determines at least one uncorrected differential pressure value representative of the stable operating conditions, and with regard to a detection after the end of operation of the internal combustion engine determines a value for an offset parameter of a characteristic of the differential pressure sensor, as a function of the determined offset parameter value and the uncorrected differential pressure value representative of the stable operating conditions determines a corrected minimum differential pressure value and checks whether the corrected minimum differential pressure value satisfies a predefined error criterion for an incorrect connection.

25. A device for detecting an incorrectly connected differential pressure sensor with a high and a low pressure connection to an exhaust gas duct of an internal combustion engine in parallel with a particle filter in the exhaust gas duct, comprising a sensor interface for acquiring sensor signals from the differential pressure sensor, which represent uncorrected values for the differential pressure present at the differential pressure sensor, and a detection facility connected to the sensor interface which receives the sensor signals and, on the basis of the sensor signals, checks during operation of the internal combustion engine whether according to at least one predefined criterion stable operating conditions are prevailing in the exhaust gas duct, and at least if stable operating conditions are present determines at least one uncorrected differential pressure value representative of the stable operating conditions, and with regard to a first detection during operation of the internal combustion engine checks whether the uncorrected differential pressure representative of the stable operating conditions satisfies a first predefined error criterion for an incorrect connection, and with regard to a second detection after the end of operation of the internal combustion engine determines a value for an offset parameter of a characteristic of the differential pressure sensor, as a function of the determined offset parameter value and the uncorrected differential pressure value representative of the stable operating conditions determines a corrected minimum differential pressure value and checks whether the corrected minimum differential pressure value satisfies a second predefined error criterion for an incorrect connection.

* * * * *